UNITED STATES PATENT OFFICE.

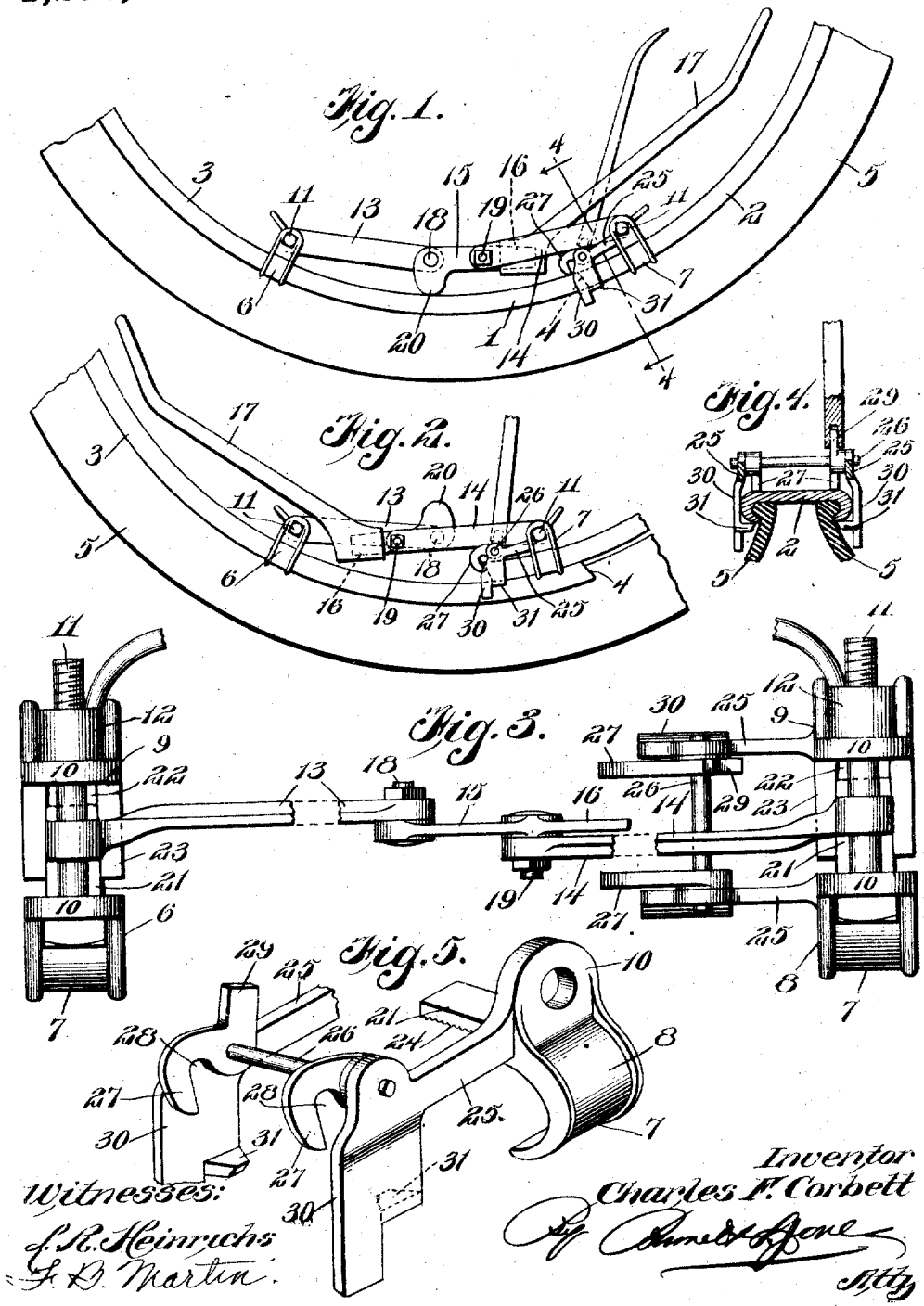

CHARLES F. CORBETT, OF CLEAR SPRING, MARYLAND.

DEVICE FOR EXPANDING AND CONTRACTING DEMOUNTABLE RIMS.

1,258,195.  Specification of Letters Patent.  Patented Mar. 5, 1918.

Application filed April 16, 1917. Serial No. 162,382.

*To all whom it may concern:*

Be it known that I, CHARLES F. CORBETT, a citizen of the United States, residing at Clear Spring, in the county of Washington and State of Maryland, have invented certain new and useful Improvements in Devices for Expanding and Contracting Demountable Rims, of which the following is a specification.

This invention relates to improvements in devices for expanding and contracting demountable rims, and particularly to improvements in rim expanding and contracting devices of the general type disclosed in my prior Patent No. 1,220,321, dated March 27, 1917.

One object of the present invention is to provide novel and improved means for holding the rim ends in normal expanded condition and maintaining them in proper relative position against lateral or other displacement, so as to always insure a proper relative arrangement of the parts to prevent the same from binding or otherwise interfering with the joint breaking and rim expanding action of the expander and contractor.

A further object of the invention is to provide novel and improved means for easily and positively "breaking" the joint or relatively displacing the rim ends to place them in proper condition for a free and easy expanding action.

A still further object of the invention is to provide a novel construction of clips or connectors for coupling the links of the expanding and contracting device with the ends of the rim, whereby a firm and durable form of connection is produced.

With these and other objects in view, the invention consists of the features of construction, combination and arrangement of parts, hereinafter fully described and claimed, reference being had to the accompanying drawing, in which:—

Figure 1 is a fragmentary side elevation of a portion of a vehicle rim and tire showing the application of the invention with the rim in normal expanded condition.

Fig. 2 is a similar view showing the rim ends separated and the rim contracted.

Fig. 3 is a sectional plan view of the rim and expanding and contracting device.

Fig. 4 is a vertical transverse section on the line 4—4 of Fig. 1.

Fig. 5 is a perspective view of the parts of the releasing or joint breaking device.

Referring to the drawing, 1 and 2 respectively designate the ends of a split demountable rim 3, said rim ends being separated by the usual transverse slit 4, and 5 designates a pneumatic tire of any suitable type mounted upon the rim.

The expanding and contracting device comprises a pair of clips or connectors 6 and 7 applied respectively to the rim ends 1 and 2, the clip 6 being applied to the end 1 at a point somewhat distant from the split or joint 4, while the clip 7 is applied to the rim end 2 at a point in close proximity to said split or joint. Each of these clips or connectors consists of a pair of clamping jaws 8 and 9 provided with apertured ears or eyes 10 for the passage of a combined fastening and pivot bolt 11 provided with a clamping and retaining nut 12, the clamps of each clip or connector being united by the bolt which extends transversely across the inner side of the rim.

Pivoted at their outer ends to the clips or connectors 6 and 7 are toggle links or levers 13 and 14, which pivotally engage the respective bolts 11, and which toggle links or levers are pivotally coupled at their inner ends by an actuating lever 15. This lever 15 is pivoted at one end to the inner end of the link 13 and is pivoted intermediate of its ends to the inner end of the link 14, the opposite or free end of the lever forming an arm 16 for engagement with a detachable operating handle or lever 17, whereby the said actuating lever 15 may be swung in either direction longitudinally of the rim for the purpose of expanding or contracting the same. The pivotal connections 18 and 19 between the links 13 and 14 and the lever 15 may consist of bolts or other equivalent coupling members. A lug or projection 20 is provided upon the lever or upon one of the links to abut against the rim when the parts are in closed position. The lug 20 serves as a rest or support for the links and lever, on which the lever may swing as a fulcrum, so that ample leverage may be obtained to straighten out the link 13 and lever 15 to spread the ends of the rim apart in the expanding action and to permit of the use of a releasing or joint breaking device to preliminarily separate the rim ends before the contracting action. The operation of the device, so far as the parts above described are concerned, may be the same as that set forth in my prior patent hereinbefore referred to.

For the purpose of securing additional strength and a bracing connection between the jaws of each clip, I provide one of the jaws of each clip with a tapered tongue or projection 21 to fit within a correspondingly shaped recess 22 formed in a bifurcated projection 23 extending from the other jaw of the clip, whereby the jaws will be interlocked and maintained rigidly in alinement and braced against displacement under pressures and strains. I also preferably provide the inner surfaces of the tongue and projection with teeth or serrations 24 to bite against the rim and hold the clip or connector against any possibility of shifting longitudinally.

In order to enable the rim ends to be normally held in alinement, moved vertically in opposite directions for a joint breaking action and guided in proper relationship during such joint breaking action, I provide a releasing or separating device which is shown as mounted upon the clip 7. This device consists of a pair of arms 25 projecting inwardly from the jaws of the clip 7 immediately across the joint or split 4 in the rim and provided at their outer ends with bearings for a rock shaft 26 carrying a pair of cam elements 27 to bear upon the rim end 1 in close proximity to the joint. These cam elements are preferably hook-shaped to form cam surfaces and to provide accommodation slots or recesses 28. Integral with the rock shaft or one of the cams is a lever arm 29 adapted to receive an operating handle or lever whereby the shaft may be turned in a direction toward the clip 6 to cause the cams to ride upon and depress the rim end 1 at the same time that the arms 25 are raised to elevate the rim end 2 through the medium of the clip 7, thus depressing one rim end and raising the other for a joint breaking action preliminary to the expansion of the rim by the expanding and contracting device. The arms 25 have extensions 30 forming guide members which project at an angle down upon the sides of the rim and across the joint so as to guide the rim ends and maintain them in alinement during the separating action. By this means any tendency of the rim ends to move laterally out of alinement during the separating action will be avoided, and hence binding of the parts of the releasing device or expanding and contracting device will be obviated and interference with their free movements prevented. The guiding extensions 30 have inturned lugs 31 which extend under and engage the outer edges of the side flanges of the rim end 2, so that on the downward or outward movement of the cams 27 to depress the rim end 1 an upward or inward pull will be transmitted to the rim end 2, thus securing a quick and positive joint breaking action.

It will thus be seen that my invention provides means for applying the clips or connectors of the tool to the rim ends in a more rigid and reliable manner, to adapt the same to grip the rim firmly and to be held thereon against any possibility of casual loosening or displacement. While the construction shown is preferred, it will of course be understood that a single cam member extending entirely across the rim may be employed instead of a pair of spaced cam members, and that other changes or modifications, falling within the spirit and scope of the appended claims, may be made without departing from the invention.

The purpose of the slots 28 is to accommodate and receive the end edges of the rim end 2 when said end is raised and the end 1 depressed, thus allowing said rim ends and the parts of the apparatus to move easily and without binding or interference.

Having described my invention, I claim:

1. In a rim spreader and contractor, the combination of clips to engage the rim ends, mechanism carried by the clips for spreading and contracting the rim, arms extending from one of the clips, a rock shaft mounted upon said arms, a slotted substantially hook-shaped cam device carried by said shaft for engagement with the rim end at the side of the joint opposite said clip, whereby the rim ends may be spread by radial movement, and means for rocking said shaft.

2. In a rim spreader and contractor, the combination of clips to engage the rim ends, mechanism carried by the clips for spreading and contracting the rim, arms extending from one of the clips, a cam device pivotally mounted upon said arms to engage the rim end on the side of the joint opposite that on which the said clip is arranged, and guiding extensions carried by the arms.

3. In a rim spreader and contractor, the combination of clips to engage the rim ends, mechanism carried by the clip for spreading and contracting the rim, arms extending from one of the clips, a cam device pivotally mounted upon said arms to engage the rim end on the side of the joint opposite that on which the said clip is arranged, guiding extensions carried by the arms, and lugs carried by said extensions to engage the outer edges of the side flanges on the second named rim end.

In testimony whereof I affix my signature in the presence of two witnesses.

CHARLES F. CORBETT.

Witnesses:
B. AURELIA HANWAY,
BENNETT S. JONES.